(12) United States Patent
Suyama

(10) Patent No.: US 10,802,789 B2
(45) Date of Patent: Oct. 13, 2020

(54) INFORMATION PROCESSING DEVICE, REPRODUCING DEVICE, AND INFORMATION PROCESSING METHOD

(71) Applicant: YAMAHA CORPORATION, Hamamatsu-shi (JP)

(72) Inventor: Akihiko Suyama, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 100 days.

(21) Appl. No.: 15/714,373

(22) Filed: Sep. 25, 2017

(65) Prior Publication Data

US 2018/0081620 A1 Mar. 22, 2018

Related U.S. Application Data

(63) Continuation of application No. PCT/JP2016/077376, filed on Sep. 16, 2016.

(51) Int. Cl.
*G06F 3/16* (2006.01)
*G06F 3/0481* (2013.01)
*G06F 3/0482* (2013.01)

(52) U.S. Cl.
CPC ............ *G06F 3/165* (2013.01); *G06F 3/0482* (2013.01); *G06F 3/04817* (2013.01)

(58) Field of Classification Search
CPC ....... H04R 2227/003–005; G06F 3/048; G06F 3/165; H04L 12/2803–2838; H04L 2012/284–285
See application file for complete search history.

(56) References Cited

U.S. PATENT DOCUMENTS

| 2007/0190929 A1* | 8/2007 | Sato | ........................ G11B 27/34 455/3.06 |
| 2012/0113964 A1* | 5/2012 | Petersen | ............. H04L 12/2809 370/338 |
| 2013/0108113 A1 | 5/2013 | Zhao et al. | |

(Continued)

FOREIGN PATENT DOCUMENTS

| JP | 2012018564 A | 1/2012 |
| JP | 2013074392 A | 4/2013 |

(Continued)

OTHER PUBLICATIONS

VanLeeuwen, Jim. Greyed Out Movies in Itunes. Jul. 25, 2009. Apple.com. VanLeeuwen ("Grayed Out Movies in iTunes", published Jul. 25, 2009) (Year: 2009).*

(Continued)

*Primary Examiner* — Liang Y Li

(74) *Attorney, Agent, or Firm* — Rossi, Kimms & McDowell LLP

(57) ABSTRACT

An information processing device is provided with an information obtaining unit and a reproduction information transmitting unit. The information obtaining unit obtains first management information of content from a first reproducing device. The reproduction information transmitting unit, based on the first management information that the information obtaining unit has obtained, causes a second reproducing device to obtain reproduction information that reproduces content that the first reproducing device manages.

9 Claims, 14 Drawing Sheets

(56) References Cited

U.S. PATENT DOCUMENTS

| | | | |
|---|---|---|---|
| 2014/0181656 A1* | 6/2014 | Kumar | H04L 12/6418 |
| | | | 715/716 |
| 2014/0277644 A1 | 9/2014 | Gomes-Casseres et al. | |
| 2014/0310597 A1* | 10/2014 | Triplett | G06F 3/04883 |
| | | | 715/716 |
| 2015/0163644 A1* | 6/2015 | Soda | H04W 4/80 |
| | | | 455/3.06 |
| 2015/0187363 A1 | 7/2015 | Azumatani et al. | |
| 2015/0286360 A1 | 10/2015 | Wachter | |

FOREIGN PATENT DOCUMENTS

| | | | |
|---|---|---|---|
| JP | 2013543155 A | 11/2013 | |
| JP | 2015533441 A | 11/2015 | |
| JP | 2016119127 A | 6/2016 | |
| JP | 2016520850 A | 7/2016 | |
| WO | 2014097500 A1 | 6/2014 | |

OTHER PUBLICATIONS

International Search Report issued in International Application No. PCT/JP2016/077376 dated Oct. 18, 2016.
Written Opinion issued in International Application No. PCT/JP2016/077376 dated Oct. 18, 2016.
English translation of International Search Report issued in International Application No. PCT/JP2016/077376 dated Oct. 18, 2016, previously cited in IDS filed Sep. 25, 2017.
Office Action issued in Japanese Appln. No. 2018-539465 dated Sep. 10, 2019. English translation provided.

* cited by examiner

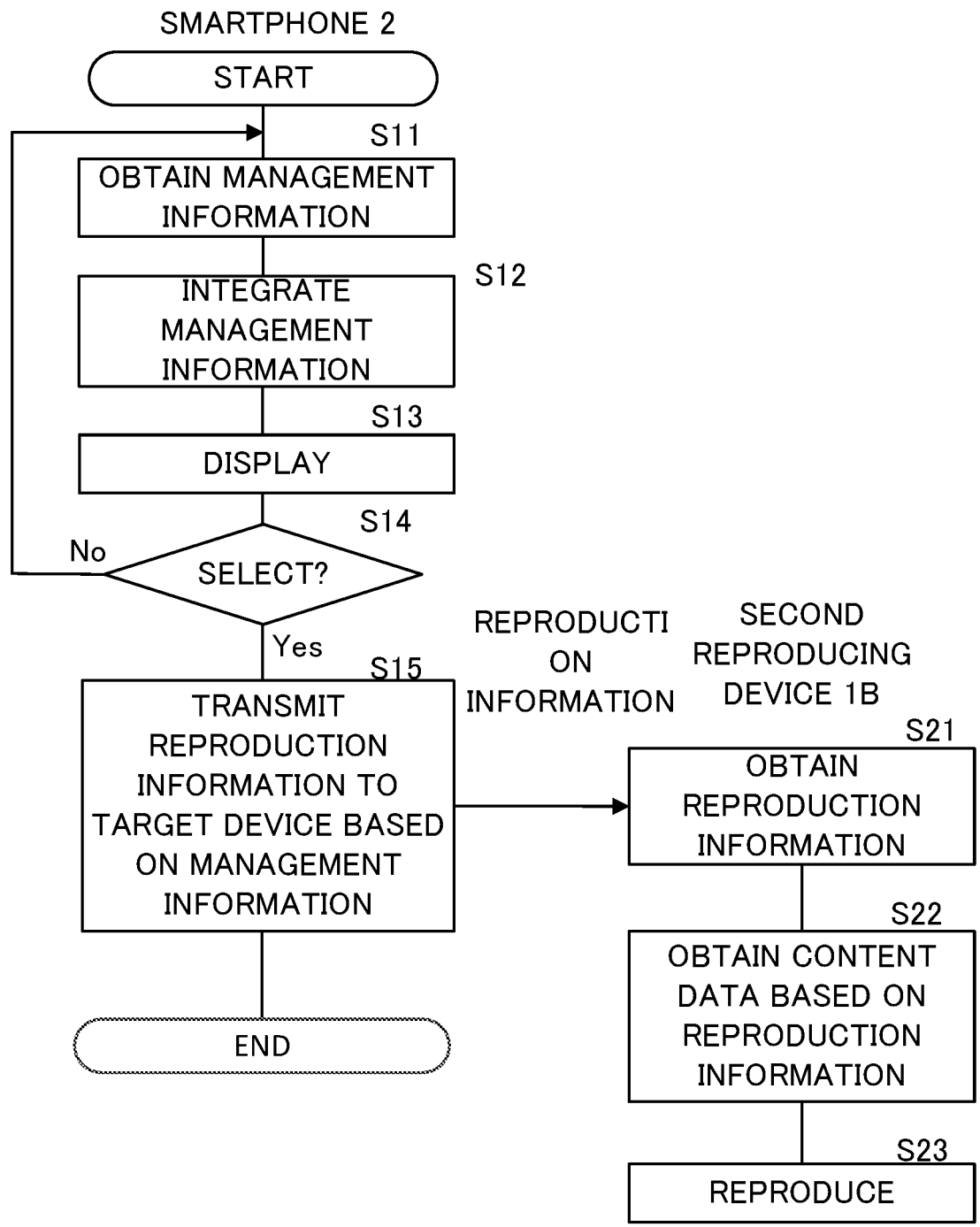

FIG. 7A
FIRST REPRODUCING DEVICE 1A

|  | SONG ID | MUSIC INFORMATION | SOURCE | ALBUM ART | ADDRESS |
|---|---|---|---|---|---|
| 1 | 001 | AAA | USB | http://www.aa⋯. | 192.168.0.12 |
| 2 | 010 | BBB | SERVER A | http://www.bb⋯. | http://bb⋯. |

FIG. 7B
SECOND REPRODUCING DEVICE 1B

|  | SONG ID | MUSIC INFORMATION | SOURCE | ALBUM ART | ADDRESS |
|---|---|---|---|---|---|
| 1 | 002 | CCC | USB | http://www.cc⋯. | 192.168.0.13 |
| 2 | 003 | DDD | USB | http://www.dd⋯. | 192.168.0.14 |

FIG. 10A
FIRST REPRODUCING DEVICE 1A

|   | SONG ID | MUSIC INFORMATION | SOURCE | ALBUM ART | ADDRESS |
|---|---|---|---|---|---|
| 1 | 001 | AAA | USB | http://www.aa⋯. | 192.168.0.12 |
| 2 | 010 | BBB | SERVER A | http://www.bb⋯. | http://bb⋯. |

FIG. 10B
SECOND REPRODUCING DEVICE 1B

|   | SONG ID | MUSIC INFORMATION | SOURCE | ALBUM ART | ADDRESS |
|---|---|---|---|---|---|
| 1 | 002 | CCC | USB | http://www.cc⋯. | 192.168.0.13 |
| 2 | 003 | DDD | USB | http://www.dd⋯. | 192.168.0.14 |

FIG. 10C
SLAVE MACHINE 11A

|   | SONG ID | MUSIC INFORMATION | SOURCE | ALBUM ART | ADDRESS |
|---|---|---|---|---|---|
| 1 | 004 | EEE | USB | http://www.ee⋯. | 192.168.0.15 |

FIG. 10D
SLAVE MACHINE 11B

|   | SONG ID | MUSIC INFORMATION | SOURCE | ALBUM ART | ADDRESS |
|---|---|---|---|---|---|
| 1 | 005 | FFF | SERVER F | http://www.ff⋯. | http://ff⋯. |

INFORMATION PROCESSING DEVICE, REPRODUCING DEVICE, AND INFORMATION PROCESSING METHOD

CROSS REFERENCE TO RELATED APPLICATIONS

The present application is a continuation of International Application No. PCT/JP2016/077376, filed on Sep. 16, 2016, the entire contents of which is incorporated herein by reference.

BACKGROUND OF THE INVENTION

1. Field of the Invention

A preferred embodiment of the present invention relates to an information processing device that obtains predetermined information and performs various kinds of processing according to the obtained information.

2. Description of the Related Art

Japanese National Publication of International Application No. 2015-533441 discloses a delivery system that delivers content from a player to another player through a network. As disclosed in Japanese National Publication of International Application No. 2015-533441, such a delivery system performs synchronous reproduction by causing a first player to reproduce content, delivering the content from the first player to a second player, and causing the second player to reproduce the content.

As disclosed in Japanese National Publication of International Application No. 2016-520850, a general player stores a playlist (also referred to as a favorite, an album, and the like) that shows any content that a user has selected as management information for managing content. The user can reproduce any self-selected content by reading out the playlist stored in the player.

The number of players (master units) that perform content delivery is not necessarily one. For example, a delivery system may be provided with a first reproducing device and a second reproducing device as a plurality of master units. In such a case, the first reproducing device and the second reproducing device are each installed in different places and reproduce different content.

In some cases, a user, when being in a place in which the first reproducing device is installed, for example, may desire to read out a playlist stored in the second reproducing device and reproduce any content that is managed in the second reproducing device.

In other cases, when a plurality of reproducing devices are present in this manner, a user may desire to freely reproduce any content managed in each of the reproducing devices in any reproducing device.

SUMMARY OF THE INVENTION

In view of the foregoing, a preferred embodiment of the present invention is directed to provide an information processing device that, when a plurality of reproducing devices are present, allows a user to freely reproduce any content that is managed in each of the reproducing devices in any reproducing device.

An information processing device is provided with an information obtaining unit and a reproduction information transmitting unit. The information obtaining unit obtains first management information of content from a first reproducing device. The reproduction information transmitting unit, based on the first management information that the information obtaining unit has obtained, causes a second reproducing device to obtain reproduction information that reproduces content that the first reproducing device manages.

According to a preferred embodiment of the present invention, when a plurality of reproducing devices are present, a user can freely reproduce any content that is managed in each of the reproducing devices in any reproducing device.

The above and other elements, features, characteristics, and advantages of the present invention will become more apparent from the following detailed description of the preferred embodiments with reference to the attached drawings.

BRIEF DESCRIPTION OF THE DRAWINGS

FIG. 5 is a flow chart of an operation of the smartphone 2 and a second reproducing device 1B.

FIG. 7A is a diagram illustrating an example of management information, and FIG. 7B is a diagram illustrating an example different from the example of the management information in FIG. 7A.

FIG. 10A is a diagram illustrating an example of management information according to a reproducing device, FIG. 10B is a diagram illustrating an example different from the example of the management information according to the reproducing device in FIG. 10A, FIG. 10C is a diagram illustrating an example of management information according to a slave unit, and FIG. 10D is a diagram illustrating an example different from the example of the management information according to the slave unit in FIG. 10C.

DETAILED DESCRIPTION OF THE PREFERRED EMBODIMENTS

Figure 1:
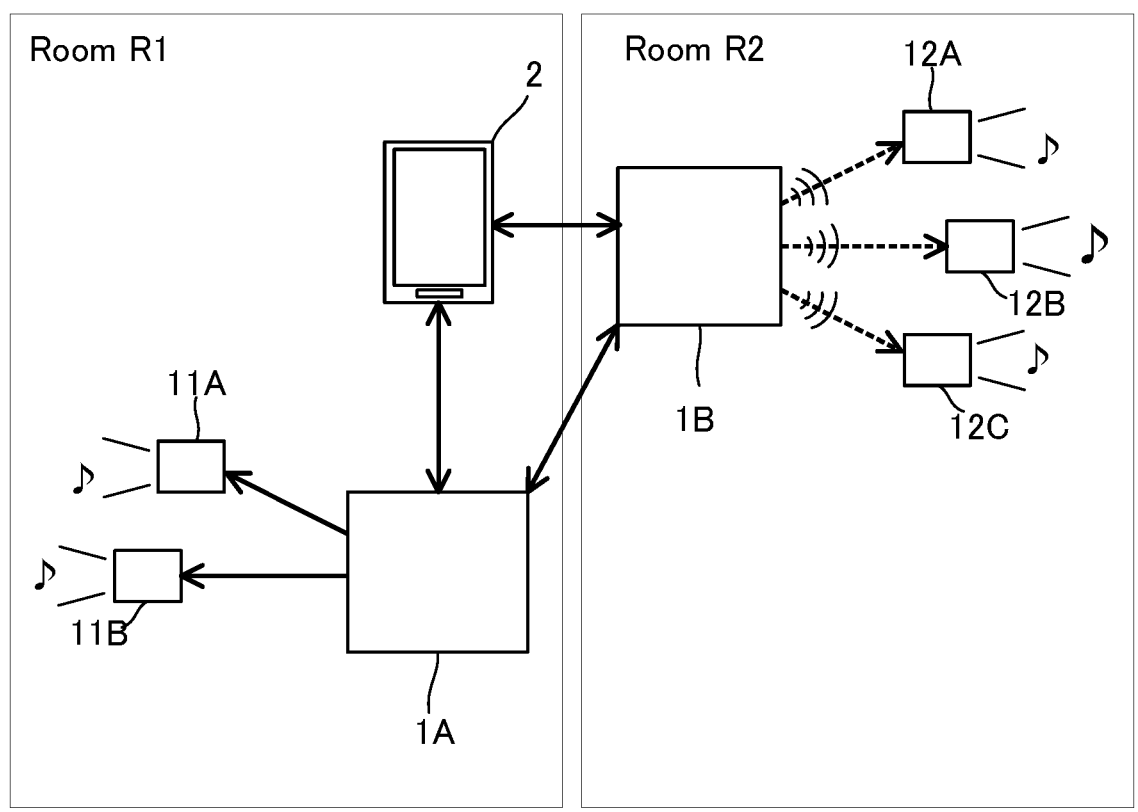
FIG. 1 is a diagram illustrating an overview of a delivery system.

FIG. 1 is a diagram illustrating an overview of a delivery system 900. The delivery system 900 is provided with a first reproducing device 1A, a first slave unit 11A, a second slave unit 11B, a second reproducing device 1B, a third slave unit 12A, a fourth slave unit 12B, a fifth slave unit 12C, and a smartphone 2.

In FIG. 1, the first reproducing device 1A, the second reproducing device 1B, and the smartphone 2 are connected through a network (LAN). It is to be noted that all the devices are in a mutually communicable state through a router (not illustrated).

The first reproducing device 1A, the first slave unit 11A, the second slave unit 11B, the second reproducing device 1B, the third slave unit 12A, the fourth slave unit 12B, and the fifth slave unit 12C respectively include an AV receiver, a set top box, a BD player, or a speaker device.

Each of the first reproducing device 1A and the second reproducing device 1B is able to transmit and receive various types of information to the smartphone 2. The smartphone 2 functions as a controller of the first reproducing device 1A and the second reproducing device 1B. Moreover, since all the devices are in a mutually communicable state through a router (not illustrated), the smartphone 2 also functions as a controller of the first slave unit 11A, the second slave unit 11B, the third slave unit 12A, the fourth slave unit 12B, and the fifth slave unit 12C.

Figure 2:
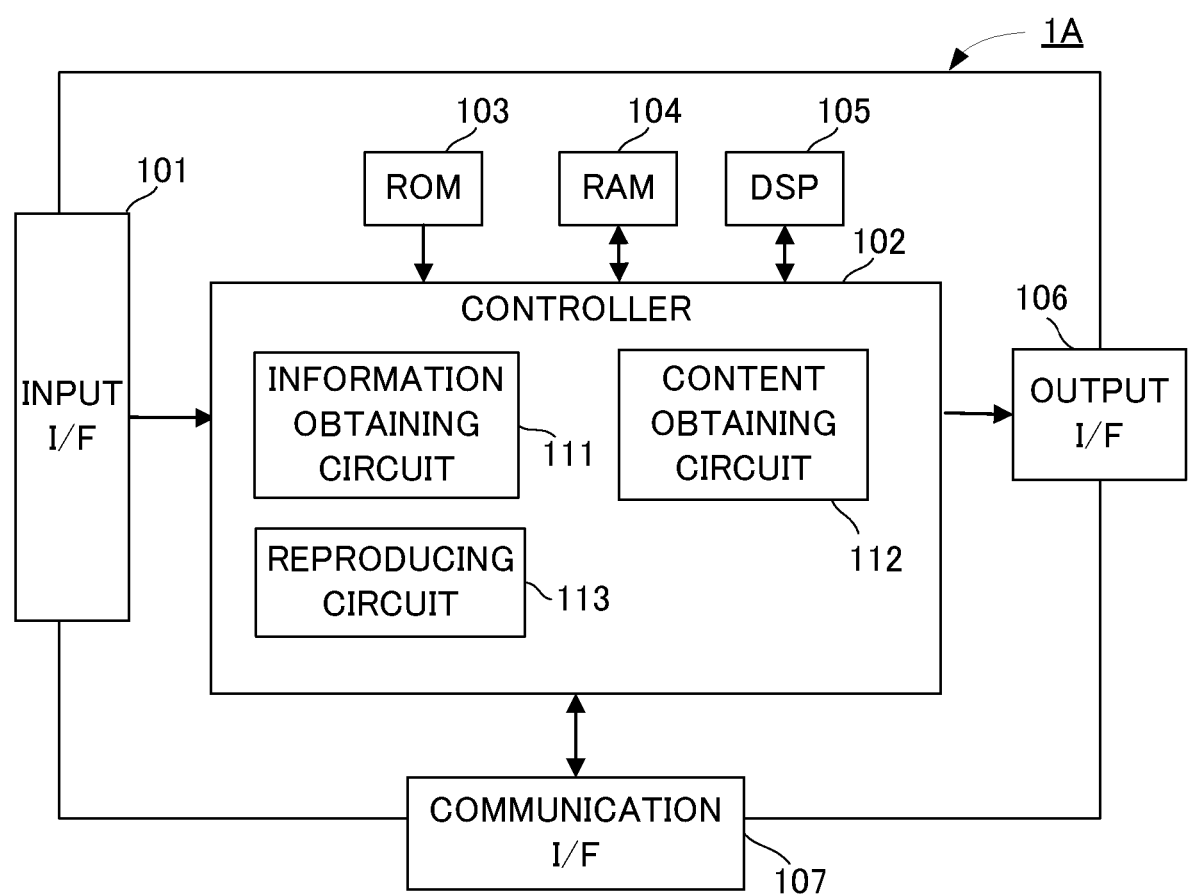
FIG. 2 is a block diagram illustrating a main configuration of a first reproducing device 1A.

FIG. 2 is a block diagram illustrating a main configuration of the first reproducing device 1A. While FIG. 2 illustrates the configuration of the first reproducing device 1A as a representative example, the second reproducing device 1B also has the same configuration and the same functions. In addition, the first slave unit 11A, the second slave unit 11B, the third slave unit 12A, the fourth slave unit 12B, and the fifth slave unit 12C also have the same configuration and functions as the first reproducing device 1A. While, in the example, the first reproducing device 1A and the second reproducing device 1B serve as a master unit that performs content delivery, the first slave unit 11A, the second slave unit 11B, the third slave unit 12A, the fourth slave unit 12B, or the fifth slave unit 12C is also able to function as a master unit that performs content delivery.

The first reproducing device 1A, as illustrated in FIG. 2, is provided with an input interface (I/F) 101, a control unit 102, a ROM 103, a RAM 104, a DSP 105, an output I/F 106, and a communication I/F 107.

The control unit 102, by reading out a program stored in the ROM 103 to the RAM 104 as a work memory and executing the program, controls the various components of the first reproducing device 1A in an integrated manner.

The input I/F 101 has a plurality of interfaces such as an HDMI (registered trademark) terminal, a USB terminal, a digital audio terminal, or an analog audio terminal. In addition, the input I/F 101 also includes a short range network communication interface such as Bluetooth (registered trademark) or NFC. In addition, the first reproducing device 1A may include a function (player function) that reads out content data out from a medium such as a CD, a DVD, or a BD.

The input I/F 101 receives content data. The content data includes encoding data such as MPEG 4, a digital audio signal, an analog audio signal, a digital video signal, or an analog video signal. The content includes not only sound content but also text content or video content. The content data that is input into the input I/F 101 is input into the DSP 105 by control of the control unit 102.

The DSP 105 decodes the content data and converts the content data into a digital audio signal. In addition, the DSP 105 may also be able to perform various kinds of audio processing to the digital audio signal. However, the various kinds of processing of the DSP 105 may be achieved by software by the control unit 102. The audio signal or the video signal after being processed by the DSP 105 is output from the output I/F 106. The output I/F 106 is connected to a device such as a TV (not illustrated) or a speaker (not illustrated). The TV displays a video according to a video signal. In addition, the speaker outputs sound according to the audio signal.

The communication I/F 107 is an interface of a wired LAN or a wireless LAN, and the control unit 102 receives various types of information from the smartphone 2 through the communication I/F 107. The control unit 102 performs various kinds of operations based on the received control information.

In addition, the first reproducing device 1A delivers content data to the first slave unit 11A and the second slave unit 11B through the communication I/F 107. The first slave unit 11A and the second slave unit 11B each reproduce the content data that has been received from the first reproducing device 1A. The first reproducing device 1A adjusts an output timing of outputting content in the own device according to an output timing of outputting content in the first slave unit 11A and the second slave unit 11B. Accordingly, the first reproducing device 1A, the first slave unit 11A, and the second slave unit 11B are able to perform synchronous reproduction as one group. The second reproducing device 1B, the third slave unit 12A, the fourth slave unit 12B, and the fifth slave unit 12C also perform synchronous reproduction as one group by the same configuration and functions as the one group configured by the first reproducing device 1A, the first slave unit 11A, and the second slave unit 11B.

For example, in the example of FIG. 1, the first reproducing device 1A, the first slave unit 11A, and the second slave unit 11B are installed in Room 1. Therefore, a user can listen to the same content in the first reproducing device 1A, the first slave unit 11A, and the second slave unit 11B that are installed in Room 1. In the example of FIG. 1, the second reproducing device 1B, the third slave unit 12A, the fourth slave unit 12B, and the fifth slave unit 12C are installed in Room 2. Therefore, a user can listen to the same content in the second reproducing device 1B, the third slave unit 12A, the fourth slave unit 12B, and the fifth slave unit 12C that are installed in Room 2.

Figure 3:
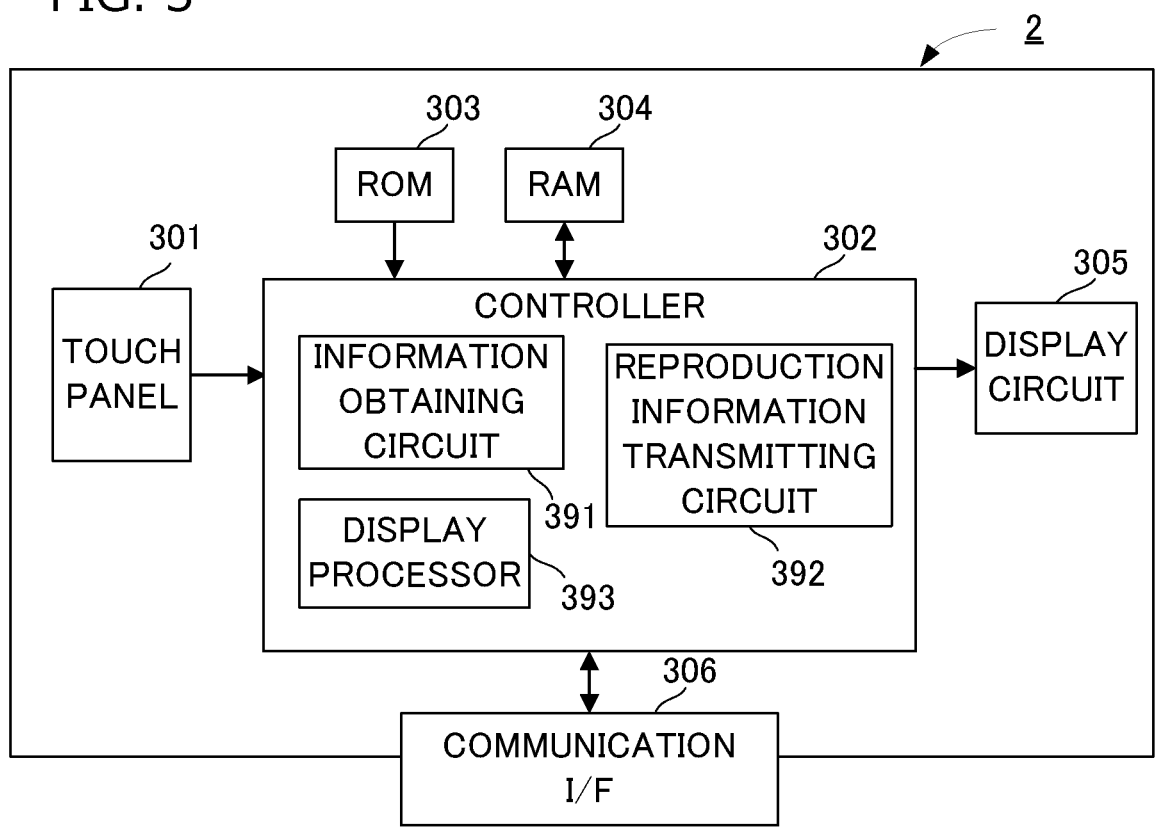
FIG. 3 is a block diagram illustrating a main configuration of a smartphone 2.

Subsequently, FIG. 3 is a block diagram illustrating a main configuration of the smartphone 2. The smartphone 2 is provided with a touch panel 301, a control unit 302, a ROM 303, a RAM 304, a display unit 305, and a communication I/F 306. The smartphone 2 is an example of an information processing device.

The touch panel 301 is equivalent to a receiving unit that receives an operation from a user. The display unit 305 presents various types of information to the user. The smartphone 2 implements a GUI (Graphical User Interface) by the touch panel 301 and the display unit 305.

The control unit 302 reads out an OS and an application program that are stored in the ROM 303 as a storage medium, to the RAM 304, and performs various kinds of operations. In the example illustrated in FIG. 3, the control unit 302 functions as an information obtaining unit 391, a reproduction information transmitting unit 392, and a display processing unit 393. The display processing unit 393, when being instructed to operate to start an application program through the touch panel 301 from a user, starts the instructed application program and displays the screen of the application program on the display unit 305.

Figure 4A:
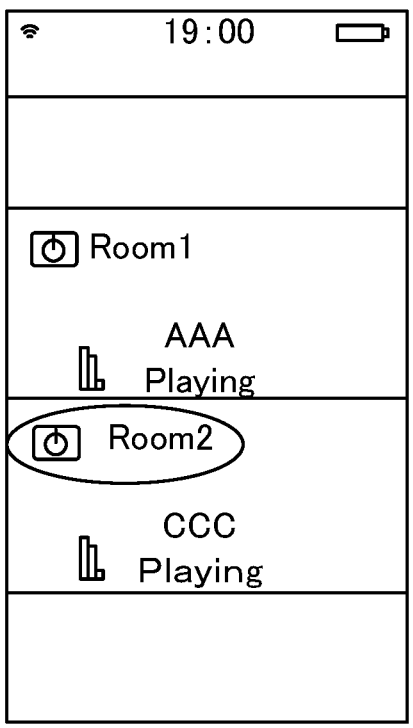
FIG. 4A is a diagram illustrating an example of an application screen.
Figure 6:
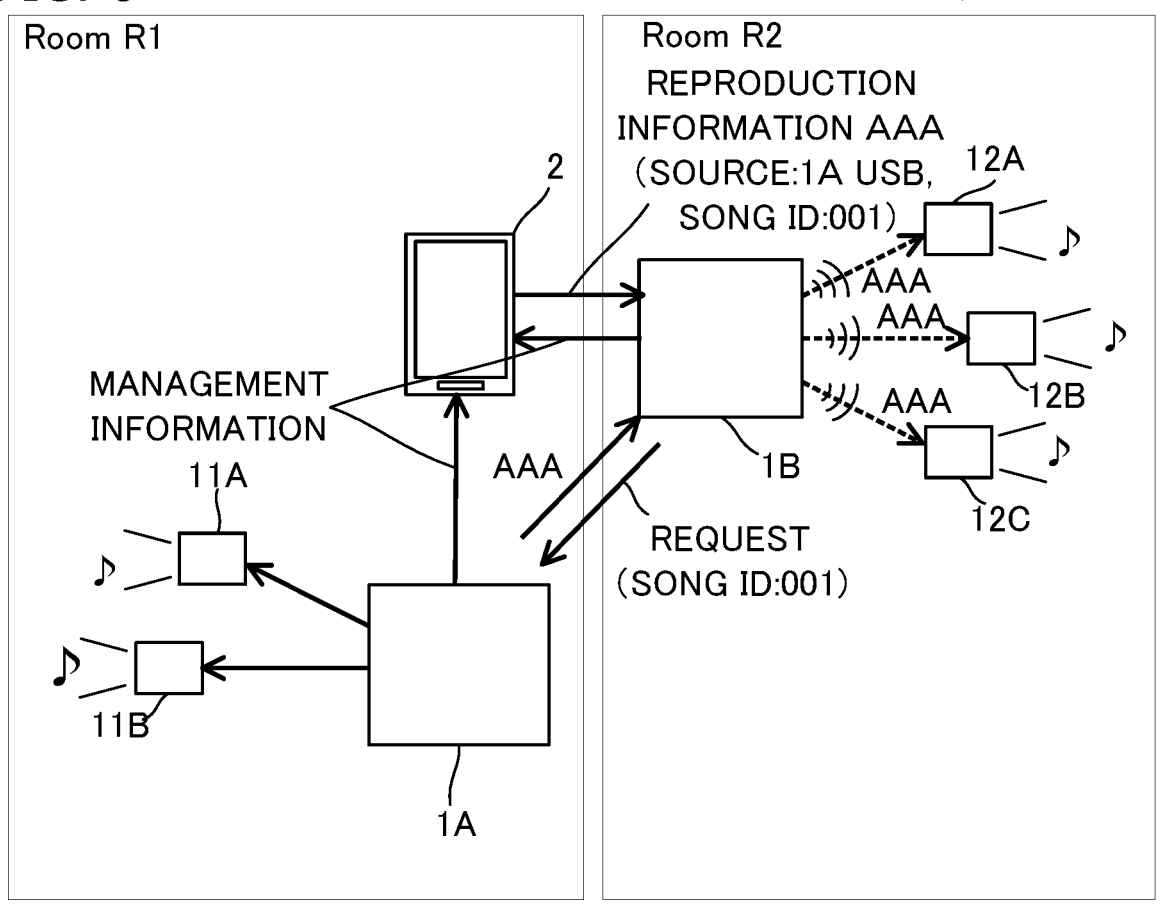
FIG. 6 is a block diagram illustrating a data flow between devices.

FIG. 4A is a diagram illustrating an example of a screen of an application program. FIG. 5 is a flowchart of an operation of the smartphone 2. FIG. 6 is a block diagram illustrating an information flow between devices. On the screen illustrated in FIG. 4A, a synchronous reproduction group configured by the first reproducing device 1A, the first slave unit 11A, and the second slave unit 11B is displayed as a group name of Room 1 that indicates an installation place. Similarly, on the screen illustrated in FIG. 4A, a synchronous reproduction group configured by the second reproducing device 1B, the third slave unit 12A, the fourth slave unit 12B, and the fifth slave unit 12C is displayed as a group name of Room 2.

Figure 4B:
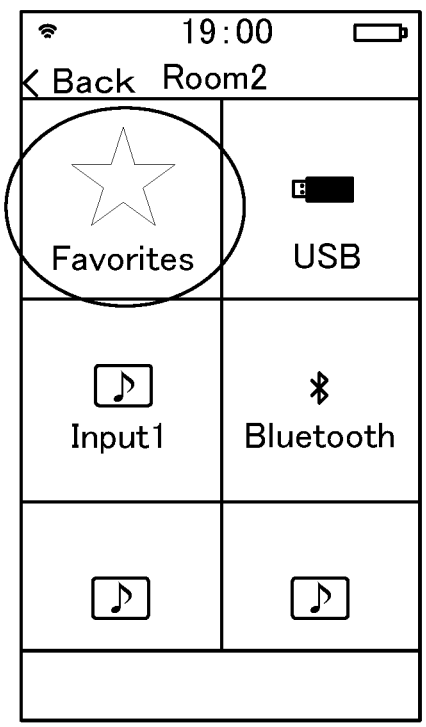
FIG. 4B is a diagram illustrating an example of a management screen.

If a user selects Room 2, for example, the control unit 302 displays a management screen of Room 2 as illustrated in FIG. 4B. On the management screen illustrated in FIG. 4B, the user can select target content to be reproduced in Room 2. For example, if the user selects a USB, the control unit 302 reads out content data from a device that is connected to the USB interface of the second reproducing device 1B that is a master unit in the group, and then reproduces the content data.

Figure 4C:
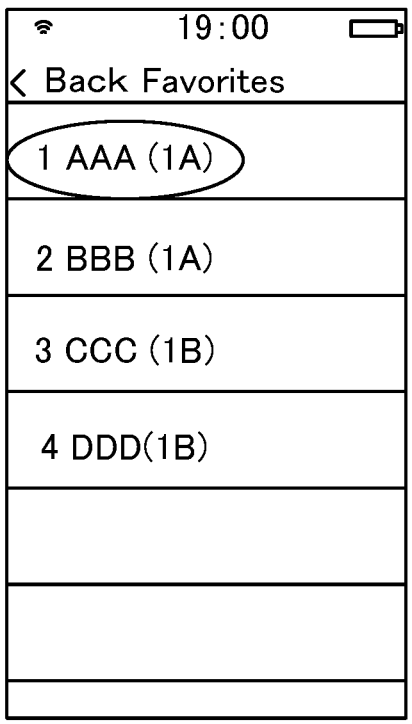
FIG. 4C is a diagram illustrating an example of a Favorites screen.

If a user, as illustrated in FIG. 4B, selects the icon image of "Favorites," the display processing unit 393 displays a Favorites screen illustrated in FIG. 4C. The display processing unit 393 according to the present preferred embodiment may obtain first management information and second management information that are stored in each of the first reproducing device 1A and the second reproducing device 1B, and, as illustrated in FIG. 4C, may preferably integrate and display the first management information and the second management information.

The management information, as illustrated in FIG. 7A and FIG. 7B, is information that shows the details of any content list that a user selects. In the example of FIG. 7A, the first reproducing device 1A stores information that shows the details of two pieces of content (music title AAA and music title BBB) as management information. The second reproducing device 1B, as illustrated in FIG. 7B, stores information that shows the details of two pieces of content (music title CCC and music title DDD) as management information. In other words, the user, in Room 1, selects the content of the music title AAA, and the content of the music title BBB as Favorites. Therefore, the first reproducing device 1A stores the management information that shows the details of the content of the music title AAA and the content of the music title BBB. In addition, the user, in Room 2, selects the content of the music title CCC, and the content of the music title DDD as Favorites. Therefore, the second reproducing device 1B stores the management information that shows the details of the content of the music title CCC and the content of the music title DDD.

In the current state, as illustrated in FIG. 4A, in Room 2, the second reproducing device 1B, based on the stored management information, reproduces the content of the music title CCC and also delivers the content of the music title CCC to the third slave unit 12A, the fourth slave unit 12B, and the fifth slave unit 12C.

The control unit 302, as illustrated in FIG. 4B, when a user selects the icon image of "Favorites," starts the operation of the flow chart illustrated in FIG. 5. To begin with, the information obtaining unit 391 in the control unit 302 obtains first management information and second management information from the first reproducing device 1A and the second reproducing device 1B, respectively (S11). Subsequently, the display processing unit 393 may preferably integrate the first management information and the second management information that have been obtained (S12), and displays the Favorites screen illustrated in FIG. 4C on the display unit 305 (S13). For example, in the example of FIG. 7A and FIG. 7B, the display processing unit 393 displays music information included in the first management information and the second management information, on the Favorites screen. Alternatively, the display processing unit 393 may also display information including a music ID (Song ID), Source, and album art, on the Favorites screen. Accordingly, a user, on the management screen of Room 2, can also see the Favorites of the first reproducing device 1A.

Then, when the user performs an operation of selecting specific content on the Favorites screen (Yes in step S14), the reproduction information transmitting unit 392 transmits reproduction information for reproducing the target content to a target reproducing device (the first reproducing device 1A or the second reproducing device 1B) based on the management information (the first management information or the second management information) (S15).

For example, as illustrated in FIG. 4C, if the user selects content (music title AAA) that is managed by the first reproducing device 1A, the information obtaining unit 391 obtains reproduction information that is information required for reproducing the music title AAA from the first management information. The reproduction information transmitting unit 392 transmits the reproduction information that has been obtained in the information obtaining unit 391 to the second reproducing device 1B. The reproduction information includes information (Source) that specifies a device in which content is stored, and information (Song ID) that specifies target content.

The Source, for example, includes the name of a device, an IP address, identification information (such as a manufacturer ID or a MAC address) that uniquely specifies a device, and information that shows an interface to which content data is input.

The Song ID may be identification information that uniquely specifies target content. Alternatively, the Song ID may be information that shows the selection location of a directory. For example, when the content of the music title AAA is stored as the second data in the directory of the top layer of a USB device, the information of "1/2" is a Song ID as information that shows a selection location.

It is to be noted that content is not necessarily obtained only in a device in a delivery system. For example, the content data that is stored in an external server may be downloaded (or streamed). In such a case, like the content indicated by Song ID: 010 in FIG. 7A, the reproduction information is shown by an address (URL) of the external server. Alternatively, when a URL is previously defined, the reproduction information may be indicated by a service name. For example, when the service name is the name of "YY," content is obtained from the URL of http://www.YY-.com. In addition, the Song ID may include information such as a URL.

In the example illustrated in FIG. 7A, the content of the music title AAA is stored in a USB device that is connected to the first reproducing device 1A. Thus, the reproduction information includes information (IP address, for example) that specifies the first reproducing device 1A and information that shows a USB device, as information of the Source and also as information with which Song ID: 001 specifies target content.

It is to be noted that the above example illustrates a mode in which the management information includes both information required to display the Favorites screen and information required to obtain reproduction information. However, the information obtaining unit 391 may first obtain information required to display the Favorites screen, may display the Favorites screen, and then may obtain reproduction information from a target device when receiving the selection of target content from a user.

As described above, if the reproduction information is transmitted to the second reproducing device 1B, the second reproducing device 1B receives the reproduction information (S21). The second reproducing device 1B obtains content data based on the received reproduction information (S22). For example, as illustrated in FIG. 4C and FIG. 6, when the reproduction information includes information of the Source including a USB device of the first reproducing device 1A and information with which Song ID: 001 specifies target content, the second reproducing device 1B demands (makes a request) to transmit the content data of Song ID: 001 with respect to the first reproducing device 1A, and obtains data of the target content. Then, the second reproducing device 1B reproduces the obtained content data (S23). The second reproducing device 1B delivers the obtained content data to the third slave unit 12A, the fourth slave unit 12B, and the fifth slave unit 12C.

Figure 4D:
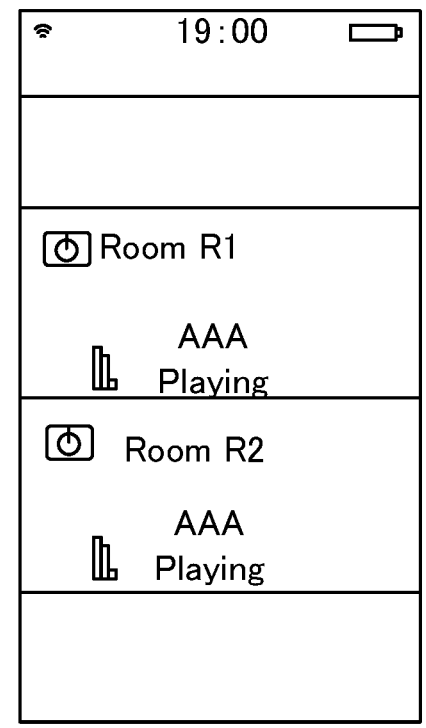
FIG. 4D is a diagram illustrating an example different from the example of the application screen in FIG. 4A.

Accordingly, as illustrated in FIG. 4D, in Room 2, the second reproducing device 1B is in a state of reproducing the content of the music title AAA and also delivering the content of the music title AAA to the third slave unit 12A, the fourth slave unit 12B, and the fifth slave unit 12C. Therefore, a user can listen to the content (music title AAA) that is managed in Room 1, in the second reproducing device 1B, the third slave unit 12A, the fourth slave unit 12B, and the fifth slave unit 12C that are installed in Room 2.

Thus, in the delivery system according to the present preferred embodiment of the present invention, when a plurality of reproducing devices are present, a user can freely reproduce any content that is managed in each of the reproducing devices in any reproducing device.

Figure 8A:
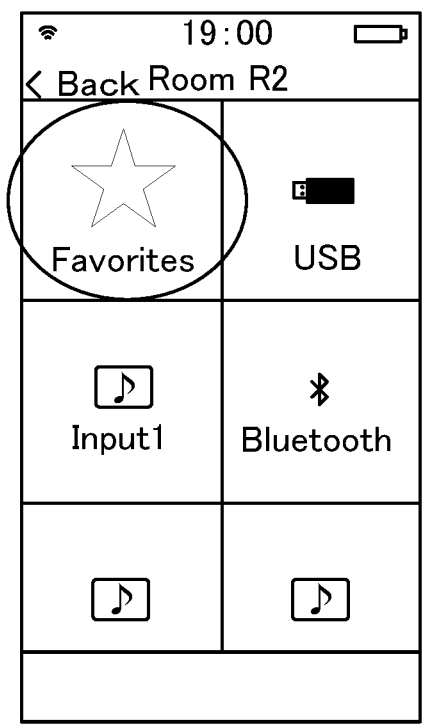
FIG. 8A is a diagram illustrating an application screen according to a modification example 1.
Figure 8B:
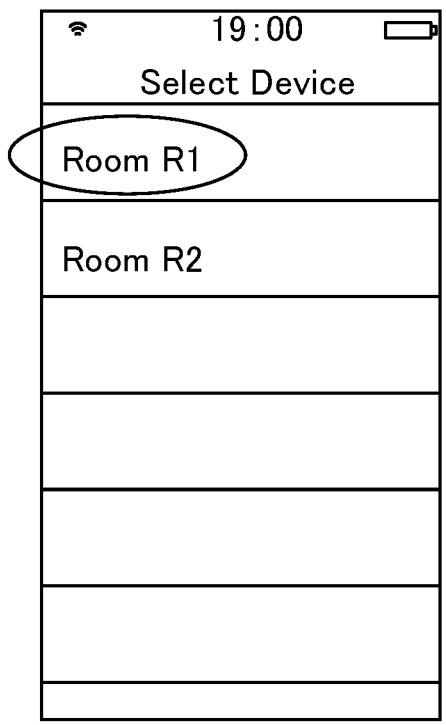
FIG. 8B is a diagram illustrating a selection screen for selecting a device according to the modification example 1.
Figure 8C:
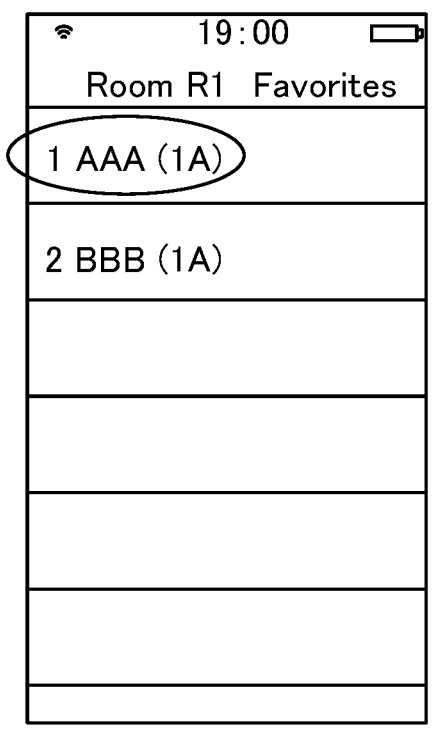
FIG. 8C is a diagram illustrating a Favorites screen according to the modification example 1.

Subsequently, FIG. 8A is a diagram illustrating an application screen according to a modification example 1. In the modification example 1, as illustrated in FIG. 8A, when a user, on the management screen of Room 2, for example, selects the icon image of "Favorites," the selection screen (group selection screen) of a device as illustrated in FIG. 8B is first displayed on the display unit 305. If a user selects Room 1, for example, the information obtaining unit 391 obtains the first management information from the first reproducing device 1A, and displays the Favorites screen of Room 1 as illustrated in FIG. 8C on the display unit 305.

Then, if the user, on the Favorites screen of Room 1, selects the content of the music title AAA, for example, as specific content, the information obtaining unit 391 obtains the reproduction information that is information required to reproduce the music title AAA from the first management information. The reproduction information transmitting unit 392 transmits the obtained reproduction information to the second reproducing device 1B.

Accordingly, in Room 2, the second reproducing device 1B is in a state of reproducing the content of the music title AAA and also delivering the content of the music title AAA to the third slave unit 12A, the fourth slave unit 12B, and the fifth slave unit 12C.

Figure 9A:
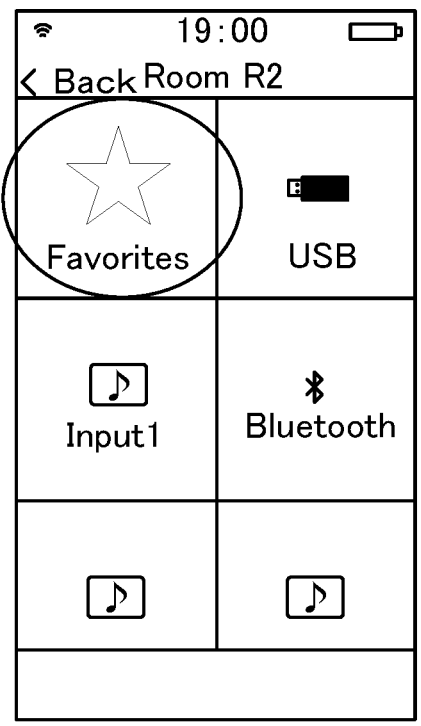
FIG. 9A is a diagram illustrating an application screen according to a modification example 2.

Subsequently, FIG. 9A is a diagram illustrating an application screen according to a modification example 2. In the modification example 2, a user may preferably obtain not only content that is managed by a reproducing device as a master unit but also the management information (third management information) of a slave unit. In addition, the modification example 2 illustrates a mode in which the content that a slave unit manages is displayed on the display unit 305 and able to be selected by a user.

Figure 9B:
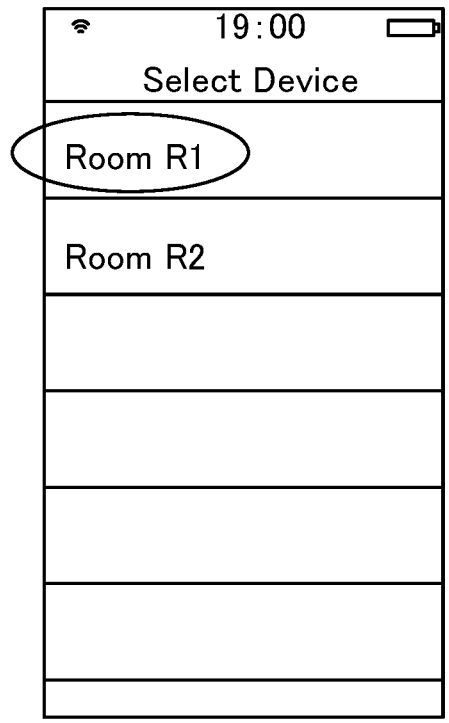
FIG. 9B is a diagram illustrating a selection screen for selecting a device according to the modification example 2.

For example, as illustrated in FIG. 9A, if a user selects the icon image of "Favorites" on the management screen of Room 2, the display processing unit 393, as illustrated in FIG. 9B, displays the selection screen (group selection screen) of a device. If a user selects Room 1, for example, the information obtaining unit 391 obtains management information (see FIG. 10A, FIG. 10B, FIG. 10C, and FIG. 10D) from each of the first reproducing device 1A, the first slave unit 11A, and the second slave unit 11B, and displays the Favorites screen of Room 1 illustrated in FIG. 9C on the display unit 305.

In this example, as illustrated in FIG. 10C, the first slave unit 11A, as management information, stores information that shows the details of a music title EEE. In addition, as illustrated in FIG. 10D, the second slave unit 11B, as management information, stores information that shows the details of a music title FFF.

As described above, the first slave unit 11A and the second slave unit 11B are also able to function as a master unit that performs content delivery. Therefore, the user, when the first slave unit 11A is used as a master unit, selects the content of the music title EEE as Favorites to be listened in a place in which the first slave unit 11A is installed. In addition, the user, when the second slave unit 11B is used as a master unit, selects the content of the music title FFF as Favorites to be listened in a place in which the second slave unit 11B is installed.

Figure 9C:
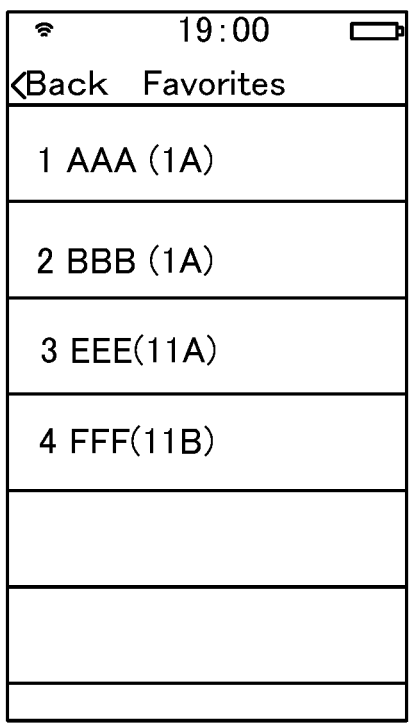
FIG. 9C is a diagram illustrating a Favorites screen according to the modification example 2.

The information obtaining unit 391, not only from the first reproducing device 1A but also from the first slave unit 11A and the second slave unit 11B, obtains the management information stored in each of the devices. Therefore, the display processing unit 393, as illustrated in FIG. 9C, displays the obtained management information of the first reproducing device 1A, the first slave unit 11A, and the second slave unit 11B, on the display unit 305.

In such a case, the user selects the content that is managed in the first slave unit 11A or the second slave unit 11B and can reproduce the content in the second reproducing device 1B.

Figure 11A:
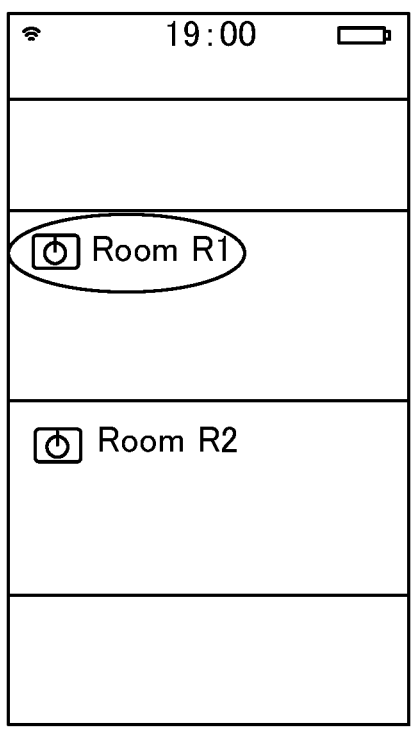
FIG. 11A is a diagram illustrating an application screen according to a modification example 3.

Subsequently, FIG. 11A is a diagram illustrating an application screen according to a modification example 3. The modification example 3 illustrates a mode in which a user displays the content that is managed by all the devices in the network and can select content.

Figure 11B:
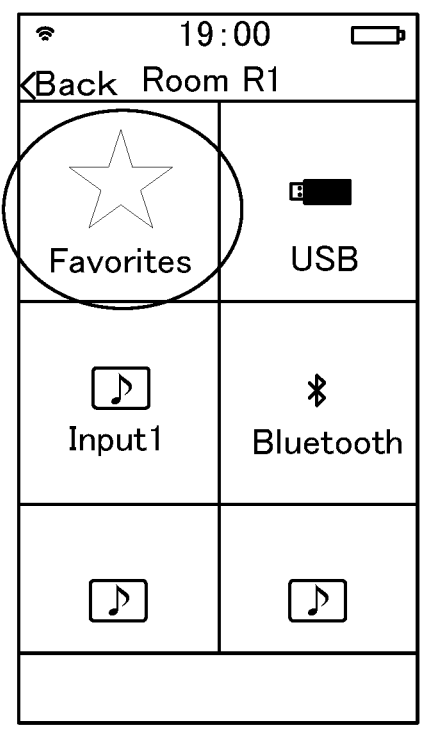
FIG. 11B is a diagram illustrating a management screen according to the modification example 3.
Figure 11C:
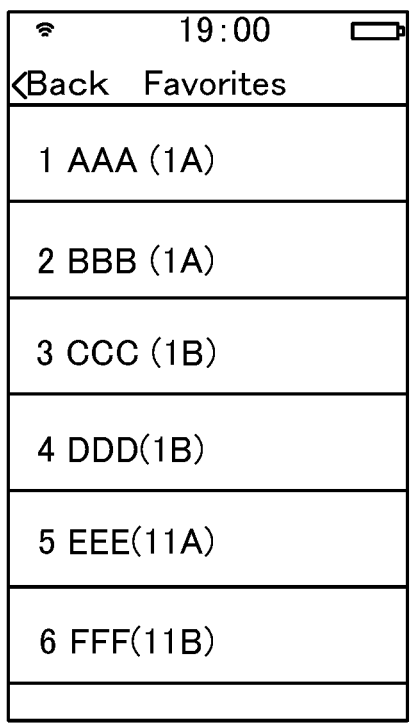
FIG. 11C is a diagram illustrating a Favorites screen according to the modification example 3.

For example, as illustrated in FIG. 11A, if a user selects Room 1, the display processing unit 393, as illustrated in FIG. 11B, displays the management screen of Room 1. On the management screen of Room 1, if a user selects the icon image of "Favorites," the information obtaining unit 391, from the first reproducing device 1A, the first slave unit 11A, the second slave unit 11B, the second reproducing device 1B, the third slave unit 12A, the fourth slave unit 12B, and the fifth slave unit 12C, obtains the management information stored in each of the devices. The display processing unit 393, as illustrated in FIG. 11C, on the Favorites screen, displays the content that is managed in all the devices of a delivery system (in the network).

Figure 14A:
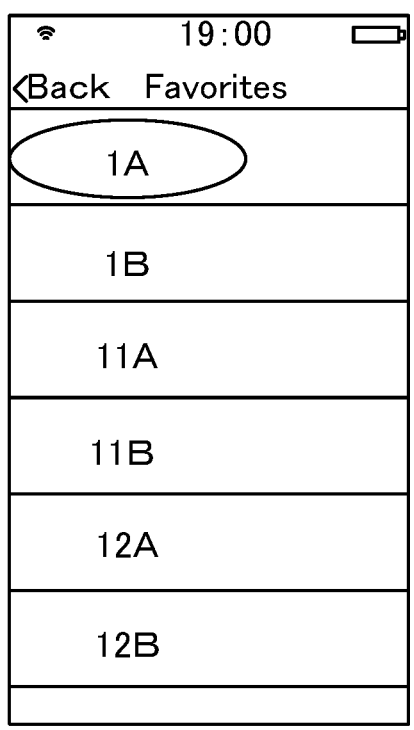
FIG. 14A is a diagram illustrating an application screen that displays a list of devices.
Figure 14B:
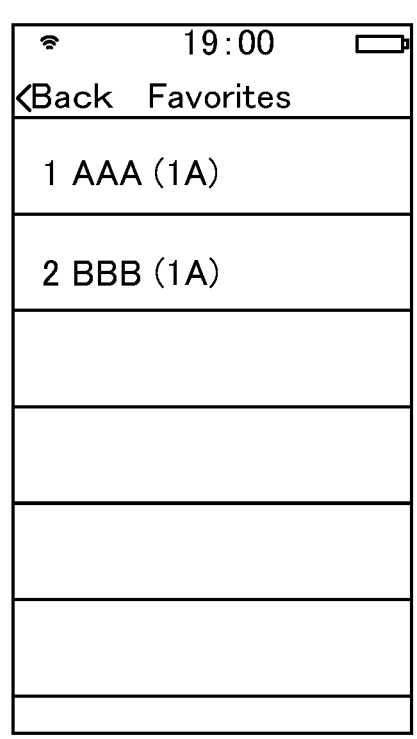
FIG. 14B is a diagram illustrating a list of content managed by a selected device.

Therefore, the user can see the content that is managed in all the devices of the delivery system. In addition, the user can reproduce any content in any reproducing device. Moreover, when the user sees the content that is managed by all the devices, to begin with, the display processing unit 393 may display a list screen of a device as illustrated in FIG. 14A on the display unit 305. If the user selects a specific device (a first delivery system 1A, for example), as illustrated in FIG. 14B, the display processing unit 393 may display the list screen of the content that is managed by the selected device, on the display unit 305.

Figure 12A:
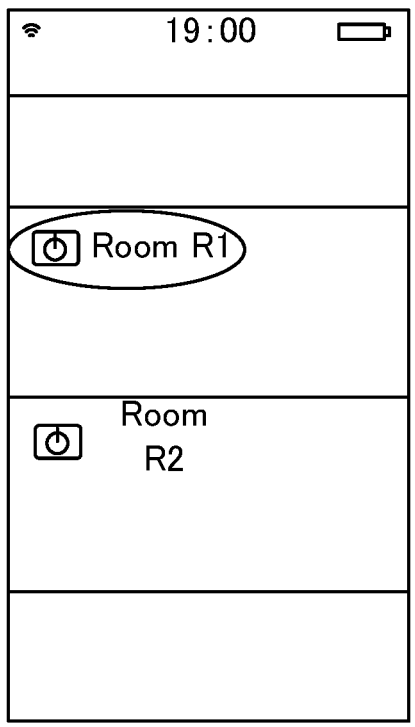
FIG. 12A is a diagram illustrating an application screen according to a modification example 4.

Subsequently, FIG. 12A is a diagram illustrating an application screen according to a modification example 4. The modification example 4 illustrates a mode in which the display processing unit 393 may separately display reproducible content and unreproducible content on the Favorites screen.

Figure 12B:
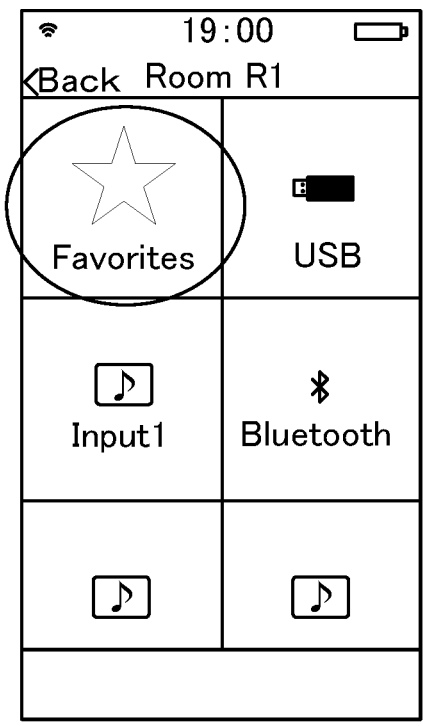
FIG. 12B is a diagram illustrating a management screen according to the modification example 4.
Figure 12C:
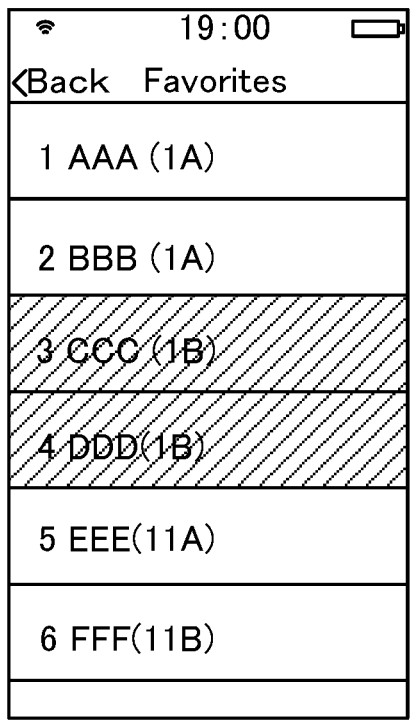
FIG. 12C is a diagram illustrating a Favorites screen according to the modification example 4.

For example, as illustrated in FIG. 12A, if a user selects Room 1, the display processing unit 393, as illustrated in FIG. 12B, displays the management screen of Room 1. If a user selects the icon image of "Favorites" on the management screen of Room 1, as illustrated in FIG. 12C, the display processing unit 393, on the Favorites screen, displays the content that is managed in all the devices of the delivery system. In a case in which the content (music title CCC and music title DDD) that is managed in the second reproducing device 1B is supposedly encoded in the latest format and the OS of the first reproducing device 1A is old, and the content that has been encoded in the latest format is not able to be reproduced, the display processing unit 393 displays in gray the content of the music title CCC and the music title DDD that have been encoded in the latest format. Alternatively, the display processing unit 393 may not display the content of the music title CCC and the music title DDD that have been encoded in the latest format, on the Favorites screen.

While the above example shows whether or not the content is in a reproducible format, a case such that video data that the first reproducing device 1A is unable to reproduce may be managed by the second reproducing device 1B, for example, is also similar.

Figure 13:
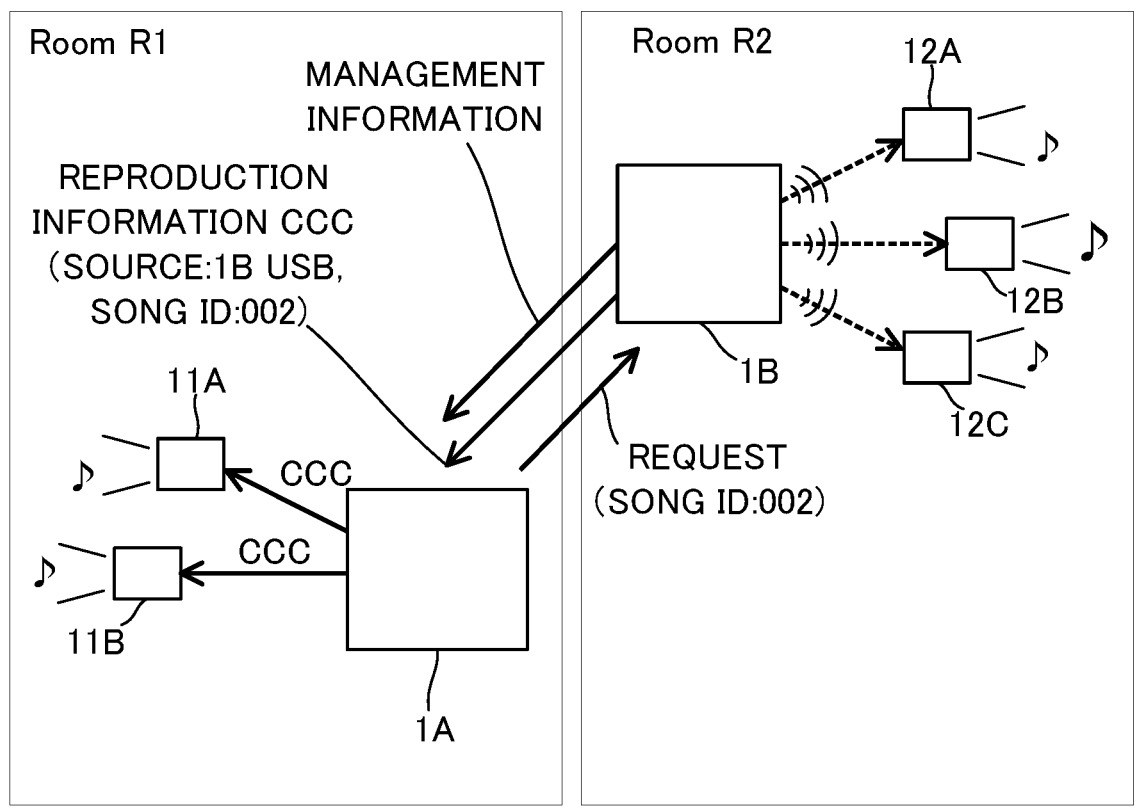
FIG. 13 is a block diagram illustrating a data flow between devices according to a modification example 5.

Subsequently, FIG. 13 is a block diagram illustrating the data flow between devices in a case in which a reproducing device actively obtains reproduction information, as a modification example 5.

In the modification example 5 without the smartphone 2, a user uses a display unit (not illustrated) and an operation unit (not illustrated) that are provided in the first reproducing device 1A, confirms a Favorites screen and performs a reproduction instruction of the content that the second reproducing device 1B has managed. Alternatively, a user may confirm the Favorites screen through the smartphone 2 and may perform a reproduction instruction of the content that the second reproducing device 1B has managed.

In the modification example 5, the control unit 102 of the first reproducing device 1A obtains the second management information from the second reproducing device 1B. The control unit 102 of the first reproducing device 1A displays a Favorites screen based on the obtained management information. If a user selects target content, the control unit 102 obtains reproduction information. The reproduction information may be extracted from the management information that has been previously obtained. In addition, the control unit 102 first obtains information required to display a Favorites screen and displays the Favorites screen, and, then, when receiving the selection of the target content from a user, may obtain reproduction information from a target device (the second reproducing device 1B).

Then, the first reproducing device 1A obtains the data of the target content based on the obtained reproduction information. For example, as illustrated in FIG. 13, when the reproduction information includes information of the Source including a USB device of the second reproducing device 1B and information with which Song ID: 002 specifies target content, the first reproducing device 1A demands (makes a request) to transmit the content data of Song ID: 002 with respect to the second reproducing device 1B, and obtains data of the target content. Then, the first reproducing device 1A reproduces the obtained content data. In addition, the first reproducing device 1A may preferably deliver the obtained content data to the first slave unit 11A and the second slave unit 11B. Alternatively, the smartphone 2 may instruct the first reproducing device 1A to obtain a reproduction instruction from the second reproducing device 1B. In such a case, the second reproducing device 1B obtains the reproduction information of the target content from a device (the second reproducing device 1B) instructed from the smartphone 2 and obtains the data of the target content.

It is to be noted that, while the above preferred embodiment describes an example in which the first reproducing device 1A and the second reproducing device 1B each function as a master unit that performs content delivery, the delivery is not essential in the present invention.

The foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. An information processing device comprising:
    a display device;
    a network communication interface configured to connect to a first reproducing device and a second reproducing device by a network, wherein the second reproducing device is a delivery device that delivers content to a slave device; and
    a processor configured to execute stored instructions to perform:
        an information obtaining task that obtains first management information of first content managed by the first reproducing device; and
        a reproduction information transmitting task that causes the second reproducing device to obtain reproduction information for reproducing the first content that the first reproducing device manages, based on the obtained first management information, the reproduction information including a content identifier and information on a source where the first content managed by the first reproducing device is stored,
    wherein the information obtaining task obtains second management information of second content managed by the second reproducing device and third management information of a third content managed by the slave device, integrates the first management information, the second management information, and the third management information into a list containing list items for content from all three devices including the first content, displays the list on the display device for user selection, wherein a content reproducible in the second reproducing device is displayed in the list in a different manner from a content unreproducible in the second reproducing device, wherein the determining of the reproducibility of the content is based on analyzing the obtained first management information, the obtained second management information, and the obtained third management information in order to determine that the unreproducible content is encoded in a format not reproducible by the second reproducing device, and wherein the reproduction information transmitting task instructs the second reproducing device to obtain the reproduction information from the first reproducing device when a target element of the list corresponding to the first content managed by the first reproducing device is selected, causing reproduction of the selected element on the slave device based at least on the obtained reproduction information.

2. The information processing device according to claim 1, wherein the first management information is information that shows the first content on a content list, a content in the content list being selectable by a user.

3. The information processing device according to claim 1, wherein the first content from the first reproducing device includes data stored in an external server.

4. The information processing device according to claim 1, wherein the second reproducing device requests data of the target content based on the obtained reproduction information from the first reproducing device and obtains the data in order to reproduce the target content.

5. A smartphone comprising the information processing device according to claim 1.

6. An information processing method comprising:
obtaining, via a network, first management information of first content managed by a first reproducing device;
transmitting to a second reproducing device to reproduction information for reproducing the first content that the first reproducing device manages, based on the obtained first management information, the reproduction information including a content identifier and information on a source where the first content managed by the first reproducing device is stored;
obtaining, via a network, second management information of second content managed by the second reproducing device, wherein the second reproducing device is a delivery device that delivers content to a slave device;
obtaining, via a network, third management information of a third content managed by the slave device;
integrating the first management information, the second management information, and the third management information into a list containing list items for content from all three devices including the first content;
displaying the list on a display device for user selection;
wherein a content reproducible in the second reproducing device is displayed in the list in a different manner from a content unreproducible in the second reproducing device, wherein the determining of the reproducibility of the content is based on analyzing the obtained first management information, the obtained second management information, and the obtained third management information in order to determine that the unreproducible content is encoded in a format not reproducible by the second reproducing device; and
causing the second reproducing device to obtain the reproduction information from the first reproducing device when a target element of the list corresponding to the first content managed by the first reproducing device is selected, causing reproduction of the selected element on the slave device based at least on the obtained reproduction information.

7. The information processing method according to claim 6, wherein the first management information includes information that shows the first content on a content list, a content in the content list being selectable by a user.

8. The information processing method according to claim 6, wherein the first content from the first reproducing device includes data stored in an external server.

9. The information processing method according to claim 6, further comprising: requesting data of the target content based on the obtained reproduction information from the first reproducing device; and obtaining the data in order to reproduce the target content.

* * * * *